(12) United States Patent
Gerlitz et al.

(10) Patent No.: US 12,168,446 B2
(45) Date of Patent: Dec. 17, 2024

(54) METHOD FOR OPERATING A MOTOR VEHICLE WITH A REMOTELY CONTROLLED PARKING ASSISTANT

(71) Applicant: Ford Global Technologies, LLC, Dearborn, MI (US)

(72) Inventors: Thomas Gerlitz, Aachen (DE); Timothy C. Bettger, Aachen (DE); Nadja Wysietzki, Cologne (DE); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 17/658,840

(22) Filed: Apr. 12, 2022

(65) Prior Publication Data
US 2022/0379904 A1    Dec. 1, 2022

(30) Foreign Application Priority Data

May 28, 2021    (DE) .......................... 102021113810.8

(51) Int. Cl.
*B60W 50/029*    (2012.01)
*B60W 30/06*    (2006.01)
(Continued)

(52) U.S. Cl.
CPC .......... *B60W 50/029* (2013.01); *B60W 30/06* (2013.01); *B60W 50/0205* (2013.01);
(Continued)

(58) Field of Classification Search
CPC ............... B60W 50/029; B60W 30/06; B60W 50/0205; B60W 50/14; B60W 2050/021;
(Continued)

(56) References Cited

U.S. PATENT DOCUMENTS 9,789,904 B2 * 10/2017 Jecker ...................... B62D 1/00
9,946,255 B2 *  4/2018 Matters .............. B62D 15/0285
(Continued)

FOREIGN PATENT DOCUMENTS

EP    3284652 A1 *  2/2018 ............ B60W 30/00
GB    2600973 A  *  5/2022 ............ B60W 30/06

OTHER PUBLICATIONS

EP 1858744 B1 with English translation. Date published Jan. 21, 2009. (Year: 2009).*

(Continued)

*Primary Examiner* — Calvin Cheung
(74) *Attorney, Agent, or Firm* — Frank Lollo; Eversheds Sutherland (US) LLP

(57) ABSTRACT

The invention relates to a method for operating a motor vehicle (2) with a remotely controlled parking assistant (6), with the steps: (S100) Reading in status data (SD) indicative of a status (S1, S2, S3, S4), (S200) Determination of at least one state (Z1, Z2) by evaluating the status data (SD), (S300) Assigning the specific state (Z1, Z2) to a state class (K1, K2) of a plurality of state classes (K1, K2), and (S400) Outputting a control data record (AS1, AS2) that is assigned to the assigned state class (K1, K2) and/or (S600) outputting an information data record (IS1, IS2) that is assigned to the assigned state class (K1, K2).

6 Claims, 2 Drawing Sheets

(51) Int. Cl.
  *B60W 50/02* (2012.01)
  *B60W 50/14* (2020.01)
  *G05D 1/00* (2006.01)
(52) U.S. Cl.
  CPC ........... *B60W 50/14* (2013.01); *G05D 1/0011* (2013.01); *B60W 2050/021* (2013.01); *B60W 2050/0292* (2013.01); *B60W 2050/0297* (2013.01); *B60W 2050/143* (2013.01); *B60W 2050/146* (2013.01)
(58) Field of Classification Search
  CPC . B60W 2050/0292; B60W 2050/0297; B60W 2050/143; B60W 2050/146; B60W 50/08; G05D 1/0011
  See application file for complete search history.

(56) References Cited

U.S. PATENT DOCUMENTS

| | | | | |
|---|---|---|---|---|
| 2016/0170494 A1* | 6/2016 | Bonnet | ................... | B60K 35/60 345/173 |
| 2018/0043884 A1* | 2/2018 | Johnson | .............. | B60W 10/184 |
| 2018/0237069 A1* | 8/2018 | Gehin | ................ | B62D 15/0285 |
| 2018/0334189 A1* | 11/2018 | Benmimoun | ...... | B62D 15/0285 |
| 2018/0364737 A1* | 12/2018 | Lavoie | .................. | B60W 30/06 |
| 2019/0016331 A1* | 1/2019 | Carlson | ................ | G05D 1/0088 |
| 2019/0152472 A1* | 5/2019 | Aksyutina | ............ | G05D 1/0055 |
| 2020/0086850 A1* | 3/2020 | Krekel | .................. | B60W 30/06 |
| 2020/0086851 A1* | 3/2020 | Krekel | .................... | E05F 15/77 |
| 2020/0117925 A1* | 4/2020 | Krekel | ................ | B60W 60/001 |
| 2020/0122716 A1* | 4/2020 | Matuk | .................. | G05D 1/0022 |

OTHER PUBLICATIONS

DE 102017012196 B4 with English translation. Date published Sep. 20, 2018. (Year: 2018).*

WO 2013053776 A2 with English translation. Date published Apr. 18, 2013. (Year: 2013).*

DE 102016115083 A1 with English translation. Date published Feb. 15, 2018. (Year: 2018).*

CN 112735178 A with English translation; date filed Dec. 31, 2020; date published Apr. 30, 2021. (Year: 2021).*

* cited by examiner

METHOD FOR OPERATING A MOTOR VEHICLE WITH A REMOTELY CONTROLLED PARKING ASSISTANT

CROSS-REFERENCE TO RELATED APPLICATIONS

This application claims priority to and the benefit of German Application No. DE 102021113810.8, filed May 28, 2021, which is hereby incorporated by reference herein in its entirety.

FIELD

The invention relates to a method for operating a motor vehicle with a remotely controlled parking assistant.

BACKGROUND

A remotely controlled parking assistant allows remote-controlled parking, which is a great help, for example, in a narrow garage or a narrow parking space. The driver of the vehicle can remain outside the motor vehicle.

With environment sensors, such as lidar, radar or ultrasonic sensors and/or camera systems, the motor vehicle detects environment data of its surroundings, and the remotely controlled parking assistant identifies suitable parking spaces for parking and determines a driving maneuver for parking in the identified parking space.

During the execution of the parking maneuver, the driver of the vehicle can remain outside the motor vehicle. The driving maneuver can be monitored and can be aborted at any time by means of a control unit designed for remote control.

A method for performing a remote-controlled parking maneuver is known from DE 10 2017 012 196 B4, for example.

From EP 1 858 744 B1 it is known to store a parking maneuver and, when necessary, to retrieve it in order to carry out the stored parking maneuver.

From U.S. Pat. Nos. 9,789,904 B2, 9,946,255 B2, US 2016/0170494 A1 and US 2018/0237069 A1, further methods for performing a remotely controlled parking maneuver are known.

For safety reasons, an error-free installation and a permanently faultless connection for the data transmission of data from the motor vehicle to the control unit and vice versa should be implemented (cf. for example UN-ECE-79).

There is a need to show ways in which an operation can be guaranteed even in the event of faults.

SUMMARY

The object of the invention is achieved by a method for operating a motor vehicle with a remotely controlled parking assistant, with the steps:
Reading in of status data indicative of a status,
Determining at least one state by evaluating the status data,
Assigning the determined state to a state class of a plurality of state classes, and
Outputting a control data record that is assigned to the assigned state class and/or outputting an information data record that is assigned to the assigned state class.
Thus, on the one hand, error cases that are for example based on an error-free installation and/or on a faulty connection for the data transmission of data can be dealt with and/or at the same time the driver of the vehicle can be informed about the current error case, so that he can take measures to eliminate the cause of the error if necessary.

According to one embodiment, a status is indicative of a failed initialization and/or a status is indicative of a failed motor vehicle start and/or a status is indicative of an interruption of a driving maneuver and/or a status is indicative of an abort. Thus different scenarios can be handled.

According to a further embodiment, a state is indicative of non-recoverability and/or a state is indicative of recoverability and/or a state is indicative of a passage of time. In other words, a distinction is made between permanent and temporary causes. Permanent causes lead to an abort, while temporary causes allow a continuation after the cause has ceased. However, if the cause is removed within a predetermined period of time, this is considered a passage of time and it is assumed that the cause is of a permanent nature. This allows the error handling to be refined.

According to a further embodiment, a state class is indicative of non-recoverability and/or a state class is indicative of recoverability and/or a state class is indicative of a passage of time. This ensures that causes of errors that are similar or related to each other are treated similarly.

According to a further embodiment, a control data record causes an end of the method and/or a control data record causes an interruption of the method and/or a control data record causes a continuation of the method. Here, the method concerns the execution of a predetermined driving maneuver. In this way, error handling can be improved.

According to a further embodiment, an information data record informs a driver of a vehicle about an end of the method and/or an information data record informs the driver of a vehicle about an interruption of the method and/or an information data record informs the driver of a vehicle about an interruption of the method. Here, too, the method concerns the execution of a predetermined driving maneuver. In this way, the driver can be informed about the detected error case and also about measures for eliminating the fault.

Furthermore, the invention includes a remotely controlled parking assistant and a motor vehicle with such a remotely controlled parking assistant.

BRIEF DESCRIPTION OF THE DRAWINGS

The invention is now explained on the basis of a drawing. In the figures.

DETAILED DESCRIPTION

Figure 1:
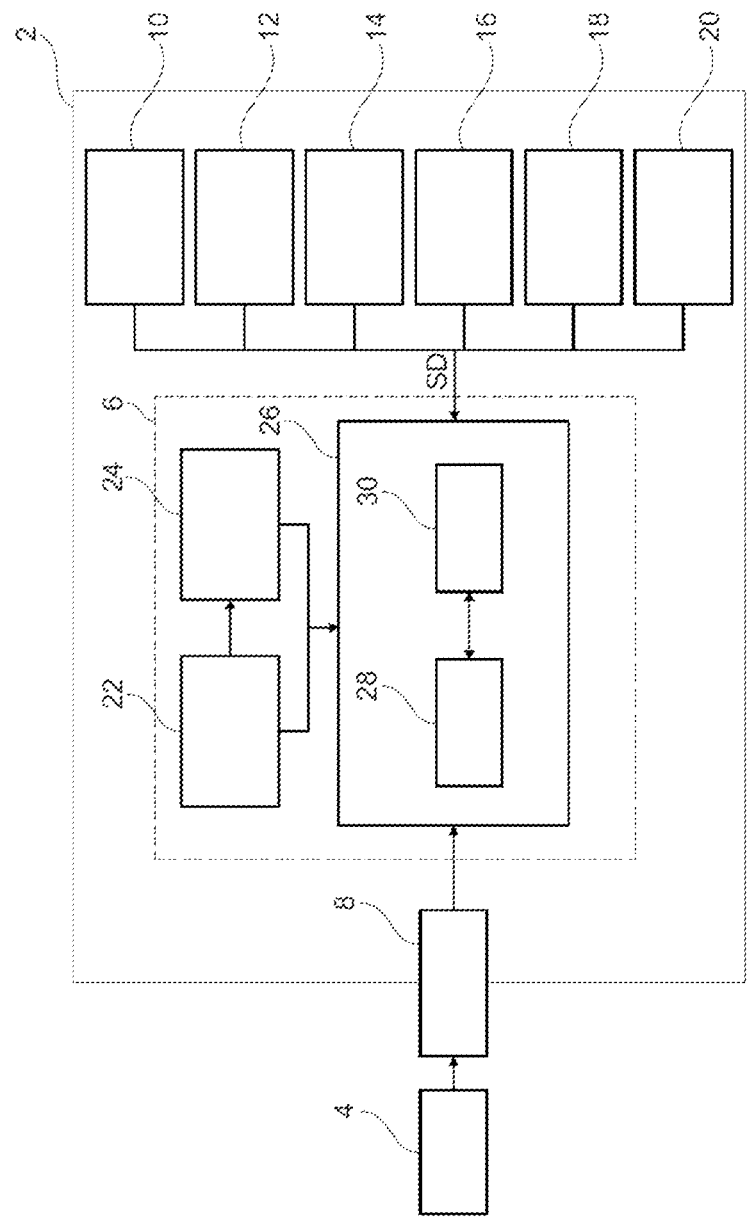
FIG. 1 shows components of a motor vehicle with a remotely controlled parking assistant in a schematic representation.

First of all, reference is made to FIG. 1.
Of the components of the motor vehicle, a remotely controlled parking assistant 6, a communication module 8, a brake control unit 10, a traction engine control unit 12, a steering control unit 14, a transmission control unit 16, a body control unit 18 and a driver position determination module 20 are shown in FIG. 1. All of the control units may include a computer or controller comprising a processor and memory individually or collectively.

In the present exemplary embodiment, the remotely controlled parking assistant 6 has an environment model 22 of the environment of the motor vehicle 2, which is created based on detected environment data and is used by a trajectory planning module 24 to determine a driving data record for a driving maneuver to maneuver the motor vehicle 2 into a parking space located in the detected environment.

Furthermore, in the present exemplary embodiment, the remotely controlled parking assistant 6 has a monitoring unit 26 with a control logic 28 and a state monitoring module 30.

Furthermore, a control unit 4 is shown in FIG. 1, with which a driver can activate the remotely controlled parking assistant 6 so that it automatically maneuvers the motor vehicle 2 into the detected parking space. The control unit 4 can be designed as a handheld, such as a smartphone. With the control unit 4, the driver can interrupt or stop the driving maneuver for parking in the detected parking space and information can be provided with the control unit 4, as will be explained in detail later.

The control unit 4, the remotely controlled parking assistant 6 and the mentioned components of the remotely controlled parking assistant 6 may have hardware and/or software components for their tasks and/or functions which are described below.

The remotely controlled parking assistant 6 is designed to read in status data SD indicative of a status S1, S2, S3, S4, for example indicative of a status of one of the components 10 to 20.

Figure 2:
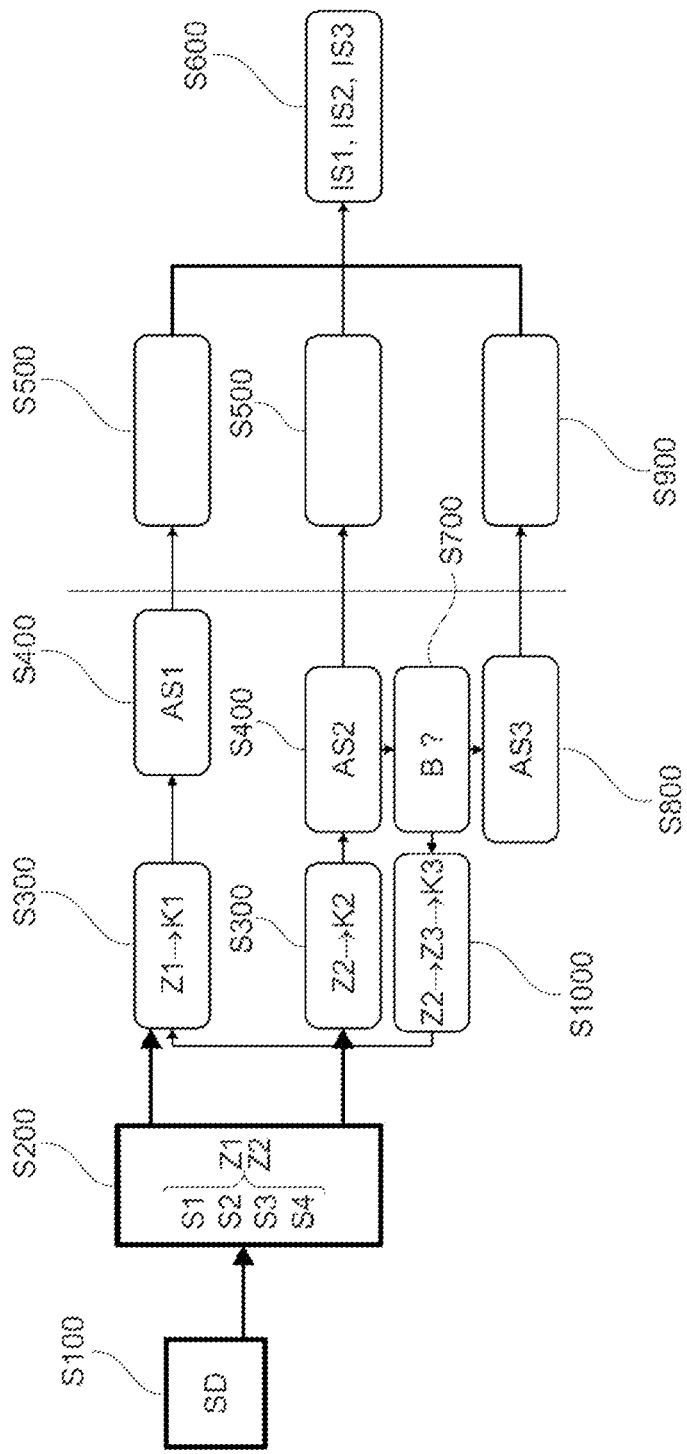
FIG. 2 shows a flow diagram for the operation of the remotely controlled parking assistant shown in FIG. 1 in a schematic diagram.

Reference is now also made to FIG. 2 in order to explain in particular the evaluation of the status data SD.

The remotely controlled parking assistant 6 is designed to read in the status data SD indicative of one of the statuses S1, S2, S3, S4 in a first step S100.

For example, the status S1 can be indicative of an unsuccessful initialization operation. The status S1 can be assigned a priority of 4, for example, where a priority of 1 is indicative of the highest priority. The presence of the status S1 indicates incorrect initialization. A recovery is not possible. Rather, an incorrect initialization can only be corrected by a new initialization.

The status S2 can be indicative, for example, of a failed motor vehicle start. A priority of 3, for example, can be assigned to the status S2. The presence of the status S2 indicates problems with the motor vehicle start. Recovery is possible if the causes of the failed vehicle start can be eliminated.

The status S3 can be indicative, for example, of an interruption of the driving maneuver. A priority of 2, for example, can be assigned to the status S3. The presence of the status S3 indicates temporary problems when performing the driving maneuver. Recovery is possible if the causes of the interrupted driving maneuver can be eliminated.

The status S4 can be, for example, indicative of a termination, such as a termination of the driving maneuver. A priority of 1, for example, can be assigned to the status S4. The presence of the status S4 indicates permanent problems when performing the driving maneuver. A recovery is not possible.

Furthermore, in the present exemplary embodiment the state monitoring module 30 of the remotely controlled parking assistant 6 is designed to determine one of the states Z1, Z2 by evaluating the status data SD in a further step S200.

The state Z1 can be indicative of non-recoverability, for example, while the state Z2 is indicative of recoverability.

Furthermore, in the present exemplary embodiment the state monitoring module 30 of the remotely controlled parking assistant 6 is designed to assign the respective determined state Z1, Z2 to a state class K1, K2 of a plurality of state classes K1, K2 in a further step S300. Analogous to the states Z1, Z2, the state class K1 may be indicative of non-recoverability, while the state class K2 is indicative of recoverability.

The state monitoring module 30 of the remotely controlled parking assistant 6 is also designed to output a control data record AS1, AS2, which is assigned to the respective state class K1, K2, in a further step S400.

The control data record AS1 assigned to the state class K1 then causes the method to end without the possibility of recoverability.

In a further step S400, the control data record AS1 is transferred from the state monitoring module 30 of the remotely controlled parking assistant 6 to the control logic 28 of the remotely controlled parking assistant 6 and is implemented there in a further step S500.

In a further step S600, an information data record IS1, which is also assigned to the state class K1, is transferred from the state monitoring module 30 of the remotely controlled parking assistant 6 to the control unit 4 and is output to inform the driver of the vehicle. This can be a text message that is played back visually or acoustically.

This may be the case, for example, if the initialization of the motor vehicle 2 is in a state in which no remote-controlled parking maneuver can be carried out and the remotely controlled parking assistant 6 rejects an activation request from the driver of the vehicle. Since the activation request itself is rejected on the basis of the current state of the motor vehicle 2, the driver of the vehicle is informed of the condition that was not met during the initialization by a message according to the information data record IS1, which is based on a detected cause.

One cause may be that a road gradient is too steep. Accordingly, the message contains an indication that parking on areas with a gradient greater than x is not possible.

Another cause may be that the motor vehicle 2 is not secured (for example inactive handbrake or parking function). Accordingly, the message contains the note that the remotely controlled parking assistant 6 cannot be activated if the motor vehicle 2 is not parked.

Another cause may be that a selection device is not in the parking mode. Accordingly, the message contains an indication that the remotely controlled parking assistant 6 cannot be activated if the selection device is not in the parking mode.

Another cause may be that the motor vehicle 2 is not stationary. Accordingly, the message contains an indication that the remotely controlled parking assistant 6 cannot be activated when the motor vehicle 2 is in motion.

Another cause may be that a trailer has been attached to the motor vehicle 2. Accordingly, the message contains an indication that the remotely controlled parking assistant 6 cannot be activated if a trailer has been attached.

Another cause may be an error reported by a functionally relevant component 10 to 20. Similarly, the message indicates that the remotely controlled parking assistant 6 cannot be activated because of a general system error.

Another cause may be that the driver cannot be located near the motor vehicle 2. Accordingly, the message contains the indication that the driver could not be located and that he should approach the motor vehicle.

Another cause may be that the engine compartment is open. Accordingly, the message contains the indication that the remotely controlled parking assistant 6 cannot be activated when the hood is open.

The driver of the vehicle can now try to eliminate the respective cause. After that, another initialization attempt can be made. Due to the varying severity of the causes checked during initialization and the impossibility of correcting some of them, non-recoverability is assumed.

But there are also a number of causes which, once detected, lead to termination. These causes represent serious violations of operating conditions of the remotely controlled parking assistant 6.

One cause may be that the engine compartment is open. Accordingly, the message contains the indication that the engine compartment is open.

Another cause may be a loss of the data connection to the control unit 4. Similarly, the message contains a message that the data connection is interrupted.

Another cause may be that an interaction with the motor vehicle 2 from outside the motor vehicle 2 was detected. Accordingly, the message contains an indication that an interaction has been detected.

Another cause may be an error reported by a function-relevant component 10 to 20. Similarly, the message contains a message that there is an error message.

Another cause can be the expiry of a period of time within which a cause for an interruption of the driving maneuver should be eliminated. Similarly, the message contains an indication that a period of time has expired.

Another cause may be that a road gradient is too steep. Accordingly, the message contains the indication that a road gradient is too steep.

Another cause may be that a trailer has been attached to the motor vehicle 2. Accordingly, the message contains the indication that a trailer has been attached to the motor vehicle 2.

Another cause may be that a traction engine of the motor vehicle 2 is unexpectedly stopped. Accordingly, the message contains the indication that the traction engine is stopped.

Another cause may be an intervention of an ABS/ESC/TCS system of the motor vehicle 2. Accordingly, the message contains an indication that there is an intervention of an ABS/ESC/TCS system.

Another cause may be a deactivation of the TCS system of the motor vehicle 2. Accordingly, the message contains an indication that the TCS system has been deactivated.

The motor vehicle 2 is immediately brought to and held at a standstill. Furthermore, the motor vehicle 2 with its components can be switched off. The driver of the vehicle can be informed by the control unit 4 about the reason for the termination of the remote-controlled parking maneuver.

The only way to activate the remotely controlled parking assistant 6 is to reactivate the remotely controlled parking assistant 6.

The control data record AS2 assigned to the state class K2, on the other hand, causes an interruption of the method with the possibility of recoverability.

In the further step S400, the control data record AS2 is transferred from the state monitoring module 30 of the remotely controlled parking assistant 6 to the control logic 28 of the remotely controlled parking assistant 6 and is implemented there in the next step S500.

In the next step S600, an information data record IS2, which is also assigned to the state class k2, is transferred from the state monitoring module 30 of the remotely controllably parking assist 6 to the control unit 4 and is output to inform the driver of the vehicle.

If the remotely controlled parking assistant 6 has been successfully initialized, the motor vehicle 2 may still be in a state where movement of the motor vehicle 2 is prohibited.

Typically, these conditions can be easily corrected by the driver.

One cause may be that a driving maneuver has not been completed. Accordingly, the message contains the indication that a driving maneuver has not been completed.

Another cause may be that a door or trunk is open. Accordingly, the message contains an indication that a door or trunk is open.

Another cause may be that another application, such as an app, is running on the control unit 4. Accordingly, the message contains the indication that another application is running on the control unit 4.

Another reason may be that there is no requested confirmation by the driver of the motor vehicle. Accordingly, the message contains the indication that there is no confirmation by the driver of the motor vehicle.

Another cause may be that the driver of the vehicle is not near the motor vehicle 2. Accordingly, the message contains the indication that the driver of the vehicle should approach the motor vehicle 2.

Another cause may be that a hazard warning light system of the motor vehicle 2 is active. Accordingly, the message contains the indication that the hazard warning lights are switched on.

The driver of the vehicle is advised to eliminate the cause that led to this state. In this case, the state monitoring module 30 continuously checks whether the cause has been eliminated or not. Once the cause is eliminated, a continuation of the driving maneuver is approved and then carried out by means of the control unit 4.

During the execution of the driving maneuver, causes can be recorded that should lead to an interruption of the driving maneuver.

Causes can be, for example: an opening of the doors/trunk, a change in the contour of the vehicle, the fact that the driver of the vehicle is no longer controlling the driving maneuver, a person interacting with the motor vehicle from the outside, or the determination that the originally planned route to the desired destination position is no longer available due to a detected obstacle. Typically, these causes can be easily eliminated by the driver of the vehicle.

One cause may be that a door or trunk is open. Accordingly, the message contains the indication that a door or trunk is open.

Another cause may be that another application, such as an app, is running on the control unit 4, which makes it impossible for a driver of the vehicle to authorize the driving maneuver by means of the control unit 4. Accordingly, the message contains the indication that another application is running on the control unit 4.

Another cause may be that there is no requested confirmation by the driver of the motor vehicle. Accordingly, the message contains the indication that there is no confirmation by the driver of the motor vehicle.

Another cause may be that the driver of the vehicle is not near the motor vehicle 2. Accordingly, the message contains the indication that the driver of the vehicle should approach the motor vehicle 2.

Another cause may be that an obstacle has been detected in the road. Accordingly, the message contains the indication that an obstacle has been detected in the road.

Another cause may be that an interaction with the motor vehicle 2 from outside the motor vehicle 2 was detected. Accordingly, the message contains the indication that an interaction with the motor vehicle 2 from outside the motor vehicle 2 was detected.

Another cause may be that a hazard warning light system of the motor vehicle 2 is active. Accordingly, the message contains the indication that the hazard warning lights are switched on.

If the driving maneuver is interrupted, the driver of the vehicle is advised to eliminate the cause that led to this state.

In this case, the state monitoring module 30 continuously checks whether the cause has been eliminated or not. Once the cause is eliminated, the driving maneuver is continued.

In a further step S700, the state monitoring module 30 of the remotely controlled parking assistant 6 monitors whether a condition B for recoverability is determined, i.e. whether the method can be continued.

If the condition B for recoverability is determined, in a further step S800, the control data record AS3 is transferred from the state monitoring module 30 of the remotely controlled parking assistant 6 to the control logic 28 of the remotely controlled parking assistant 6 and is implemented there to continue the method with the step S900, which corresponds to the step S500, i.e. the control data record AS3 is implemented.

Also analogously in a further step S600, an information data record IS3, which is also assigned to the state class k3, is transmitted from the state monitoring module 30 of the remotely controlled parking assistant 6 to the control unit 4 and is output to inform the driver of the vehicle that the method will be continued.

If, on the other hand, condition B for non-recoverability is determined, the state changes from state Z2 to state Z3 in a further step S1000. The state Z3 can be indicative of a passage of time and is assigned to a state class K3 indicative of a passage of time.

In the present exemplary embodiment, therefore, a state Z3 of the state class K3 is treated as indicative of a passage of time as with a state Z1 of the state class Z1, i.e. the assigned control data record AS1 causes an end of the method without the possibility of recoverability.

In a difference from the present exemplary embodiment, the order of the steps may also be different. Furthermore, multiple steps can also be carried out at the same time or simultaneously. Furthermore, in a difference from the present exemplary embodiment, individual steps can be skipped or omitted.

Thus, on the one hand, error cases can be dealt with which are for example based on an error-free installation and/or on a faulty connection for the data transmission of data, and/or at the same time the driver of the vehicle can be informed about the current error case, so that he can take measures to eliminate the cause of the error.

The invention claimed is:

1. A method for the operation of a motor vehicle with a remotely controlled parking assistant, the method comprising:
    initiating, by an external control unit, a parking operation of the motor vehicle;
    receiving, by the remotely controlled parking assistant, first status data indicative of a first failure of one or more components of the motor vehicle associated with parking operation;
    determining, based on the first status data, that the first failure is temporary and can be mitigated;
    outputting, based on determining that the first failure is temporary, first control data that causes a temporary ceasing of the parking operation;
    outputting information data to a device of a driver of the motor vehicle, the information data being indicative of the first failure;
    receiving second status data, the second status data indicative that the first failure is resolved;
    outputting, based on the second status data, second control data that causes the parking operation to resume;
    receiving, by the remotely controlled parking assistant, third status data indicative of a second failure of the one or more components of the motor vehicle associated with parking operation;
    determining, based on the third status data, that the second failure is a permanent failure; and
    outputting, based on the third status data, third control data that causes a permanent ceasing of the parking operation.

2. The method according to claim 1, wherein the first status data or the third status data is indicative of (i) a failed initialization or (ii) a failed motor vehicle start or (iii) an interruption of a driving maneuver or (iii) a termination of an action.

3. The method according to claim 1, wherein the information data informs the driver about an end of the parking operation or a continuation of the parking operation.

4. A remotely controlled parking assistant for a motor vehicle, comprising:
    a processor configured to:
        receive, from an external control unit, instruction to initiate a parking operation;
        read first status data indicative of a first status failure of one or more components of the motor vehicle;
        determine, based on the first status data, that the first failure is temporary and can be mitigated;
        output, based on determining that the first failure is temporary, first control data that causes a temporary ceasing of the parking operation any further operation of the motor vehicle;
        output information data to a device of a driver of the vehicle, the information data being indicative of the first failure;
        receive second status data, the second status data indicative that the first failure is resolved;
        output, based on the second status data, second control data that causes the parking operation to resume;
        receive, by the remotely controlled parking assistant, third status data indicative of a second failure of the one or more components of the motor vehicle associated with parking operation;
        determine, based on the third status data, that the second failure is a permanent failure; and
        output, based on the third status data, third control data that causes a permanent ceasing of the parking operation.

5. The remotely controlled parking assistant according to claim 4, wherein the first status data or the third status data is indicative of (i) a failed initialization or (ii) a failed motor vehicle start or (iii) an interruption of a driving maneuver or (iv) a termination of an action related to the parking operation.

6. The remotely controlled parking assistant according to claim 4, wherein the information data informs the driver of the vehicle about an end of the parking operation, or an interruption of the parking operation, or a continuation of the parking operation.

* * * * *